United States Patent

[11] 3,611,349

[72] Inventor Jean Pierre Eugene Chinal
6, rue Felicien David, Paris, 16 Seine, France

[21] Appl. No. 61,460
[22] Filed Aug. 5, 1970
[45] Patented Oct. 5, 1971
[32] Priority Jan. 4, 1966
[33] France
[31] 44692
Continuation of application Ser. No. 607,193, Jan. 4, 1967, now abandoned.

[54] BINARY-DECIMAL CONVERTER
6 Claims, 2 Drawing Figs.

[52] U.S. Cl. .......... 340/347 DD, 235/155
[51] Int. Cl. .......... H041 3/00
[50] Field of Search .......... 340/347; 235/155, 165, 154

[56] References Cited
UNITED STATES PATENTS

| | | | |
|---|---|---|---|
| 2,814,437 | 11/1957 | Woodbury | 235/155 |
| 2,929,556 | 3/1960 | Hawkins et al. | 235/155 |
| 2,970,765 | 2/1961 | Bird | 235/155 |
| 3,026,034 | 3/1962 | Couleur | 235/155 |
| 3,172,097 | 3/1965 | Imlay | 235/155 X |
| 3,257,547 | 6/1966 | Bernstein | 235/155 |
| 3,366,780 | 1/1968 | Lee et al. | 235/155 X |
| 3,373,269 | 3/1968 | Rathbun et al. | 235/155 |

*Primary Examiner*—Maynard R. Wilbur
*Assistant Examiner*—Charles D. Miller
*Attorney*—Karl W. Flocks

ABSTRACT: A method and a converter for converting a binary number to its binary-coded decimal equivalent comprising a first input shift register, three adding devices of the series type in order to determine the remainders and the partial quotients of successive divisions by 10, three carryover trigger devices associated respectively with said adding devices, a matrix for determining the said remainders, a recirculation register for the inscription of a period of correction for the determination of the quotients, an output shift register and a clock circuit cooperating with a programming device.

Inventor: Jean Pierre Eugene Chinal
By
Karl W. Flocks
Attorney

BINARY-DECIMAL CONVERTER

This application is a streamline continuation of application Ser. No. 607,193 filed on Jan. 4, 1967 now abandoned.

A large number of calculators utilize the so-called pure binary code as an internal indication of quantities. However, the information supplied by these calculators are utilized in the decimal form (dials with decimal granulations, visual electronic presentation on oscilloscopes or on electroluminescent panels, by electroincandescent segments, etc., decimal mechanical counters, printers, etc.). In addition, in certain cases, an arithmetic system working in pure binary must supply information to another arithmetic system working in a decimal code, in particular in a code of the type known as the binary-coded decimal code.

It is then necessary to make a binary-decimal conversion which is carried out automatically by a device which will be referred to in the text which follows as a binary-decimal converter. In other circumstances, as for example during the design or testing of systems working in pure binary, it is sometimes necessary to examine certain parameters during the course of testing. It is advantageous to relieve the operator of the manual conversion of the binary numbers to decimal numbers by means of an independent reading apparatus, for which the conversion time may be extremely short.

Depending on the cases concerned, the known conversion devices generally employ:

either electromechanical means; for example, if the decimal information output is carried by a mechanical system of the rotating counter type, a rotating shaft, etc., one method consists of using a binary coder in the return loop of a numerical servocontrol system and directly employing the position of the output shaft to indicate in decimal the number read. In this way, a binary-analogue decoding is combined with an analogue-decimal coding, which can be applied when so desired to other conditions. Other methods utilizing electromechanical devices also exist;

or electronic or electrical means; in addition to the intermediate transition to an analogue electrical parameter, direct methods of conversion exist which utilize codes of the binary-coded decimal type. These methods are based on the arithmetic properties of numbers or the algebraic properties of their representation by binary codes (pure binary, binary-coded decimal).

They may be carried into effect in various ways: for example there may be employed an adder-subtractor and a table of binary representations of the powers of 10 or of powers of 10 multiplied by the numbers from 0 to 9. The adder-subtractor may be that of the main arithmetic unit and may be wired or programmed to obtain the conversion. It may also be separate from it and will then be wired separately. Other methods utilize decimal counters.

The present invention has for its object to provide a device termed hereinafter a binary-decimal converter, or more briefly a converter, in order to effect the conversion of a whole binary number to its equivalent in a bit-coded decimal code.

According to the present invention there is provided a binary-decimal converter for a binary number S=10Q+R (this being decimal notation) of $n$ digits, where $n \leq 4p-2, p$ being an integer, the converter comprising an input shift register having $4p+4$ positions, means for multiplying the contents of said input register by $3\gamma_{p+1}2$ where $$\gamma_{p+1} = \underbrace{0.0001\ 0001\ \ldots\ldots\ldots\ 0001}_{p+1\ \text{times}}$$

this being binary notation an output shift register having $4p+4$ positions, a recirculation register for the inscription of a period of correction, means for adding outputs of the input register and the recirculation register, a matrix for determining, in accordance with a predetermined code, the remainder R of division by 10 (ten) of the binary number S and connected to the first four positions of the output register and to the last but one position of said input register, and a switching, programming and clock circuit for controlling the functioning and interconnections of the elements of the converter, the arrangement being such that the converter functions to determine the quotient and remainder in two stages, each of $p+1$ periods and of 4+4 clock times, each period being 4 clock times, wherein for operation S is entered in adjacent positions in the input register with the lowest order digit in the lowest order position and is multiplied by $3\gamma_{p+1}/2$ digit by digit, the resultant being reentered in said input register for the first $p$ in periods and being fed in the $(p+1)$th period digit by digit to the output register, a fractional portion $x=x_{11}x_{12}x_{13}x_{14}x_{15}$, being available to said matrix at the end of said first stage $x$ having a one-to-one relationship with R, and wherein prior to the second stage $x_{12}x_{13}x_{14}x_{15}$ is entered in said recirculation register and during said second stage is added (if $R \neq 0$) as a number with repeated periods of those four digits to the restricted complement $\bar{x}$, the number $x_{-1}2^{-1}$ 1 and the number $(1-x_{-1})2^{-(4p+5)}$ whereby the quotient Q is determined in binary form, while if R=0 here is added $\bar{x}$ and $x_{-1}2^{-(4p+5)}$ also giving Q in binary form, the restricted complement of $x$, $\bar{x}=1-x-2^{-4p-5}$, being obtainable from said input register, and by the end of said second stage Q being entered as S in the input register for further conversion.

The multiplying means may be adapted to multiply S by $\gamma'_{p+1}$=1111 1111 ... (binary notation) formed by $p+1$ periods of four figures, instead of $3\gamma_{p+1}/2$ in which case there would be means for dividing the result by 5 and then by 2, the first dividing means including a subtraction device permitting the logical operations to be carried out as defined by the equations:

$$X_k = S'_k \oplus X_{k-2} \oplus R_{k-1} R_k = X_k . \bar{S}'_k + X_k . R_{k-1} + \bar{S}'_k . R_{k-1}$$

where · is the logic product, + is the logic sum and $\oplus$ is the sum modulo 2.

The converter permits the conversion of binary whole numbers or the whole portions of mixed binary numbers, that is to say comprising a fractional portion and a whole portion. In the case where the binary numbers to be converted may be mixed, the conversion of the fractional portion and the mixed portion is effected in two distinct phases; these latter however employ essentially the same basic parts by means of a switching over of certain inputs of these members. The cost in components of a system carrying out the conversion of mixed numbers is thus hardly greater than that of a system which effects solely the conversion of whole numbers. The method for the conversion of whole numbers is based on the standard method of successive divisions by 10, which is referred to later, but differs from the standard method in the finding of the remainder and the quotient for each division by 10. When a converter of this type is employed in the conversion of mixed numbers, the fractional portion is converted following the standard method of multiplications by 10 with a search for overflow to the left. By virtue of the method of conversion described herein, the two phases of conversion of the whole portion and the fractional portion are very substantially symmetrical, and from this symmetry arises the possibility of employing a large part of the converter in both phases by the use of simple switching operations.

The converter does not employ any memory of constants. This is of special advantage when it is desired to produce an independent conversion device and when it is not then possible to employ part of the memory of a calculator.

The length $n$ of the numbers to be converted may have any desired value. In addition, the cost of a converter according to the invention is practically independent of $n$.

The conversion time is fixed for each alternative form. Modifications may however be envisaged which enable this to be shortened when the effective length (from the position of lowest rank to the position of greatest rank different from zero) is less than the maximum length $n$ of the words to be converted, which takes place necessarily during the course of conversion. These modifications are easy when starting with one of the versions described below and are within the scope of any specialist familiar with the technique of numerical calculators and will not be described in further detail. The values of the conversion times will be indicated later for the basic alternative forms and will be subject to slight variations as a function of modifications of the same kind as those referred to above.

The whole of the converter can be constructed with electronic gates and trigger units, with discrete components or components formed in integrated circuits, in microcircuits of all kinds (thin-film circuits, hybrid circuits, etc.), in logic magnetic circuits, in relays, etc., and generally by means of any complete assembly of logic elements and memory elements, of the same type as those employed in the construction of switching systems and arithmetic computers.

By means of the addition of conversion systems having four or five inputs for each decimal figure, the converter can be used to effect the conversion to any desired binary-coded decimal code having $d$ binary digits ($d \geq 4$).

By means of simple modifications which will be described later, the converter can carry out conversions from the pure binary code to any other system of weighted numeration with a single whole base or even with a multiple whole base.

They will be deduced from those which will be described later by simple modifications which can be easily undertaken by those skilled in the art and for this reason the examples of converters which are described below do not constitute a limitative list.

Other advantages and characteristic features of the present invention will be brought out in the description which follows below, reference being made to the accompanying drawings, in which.

Figures 1, 2:
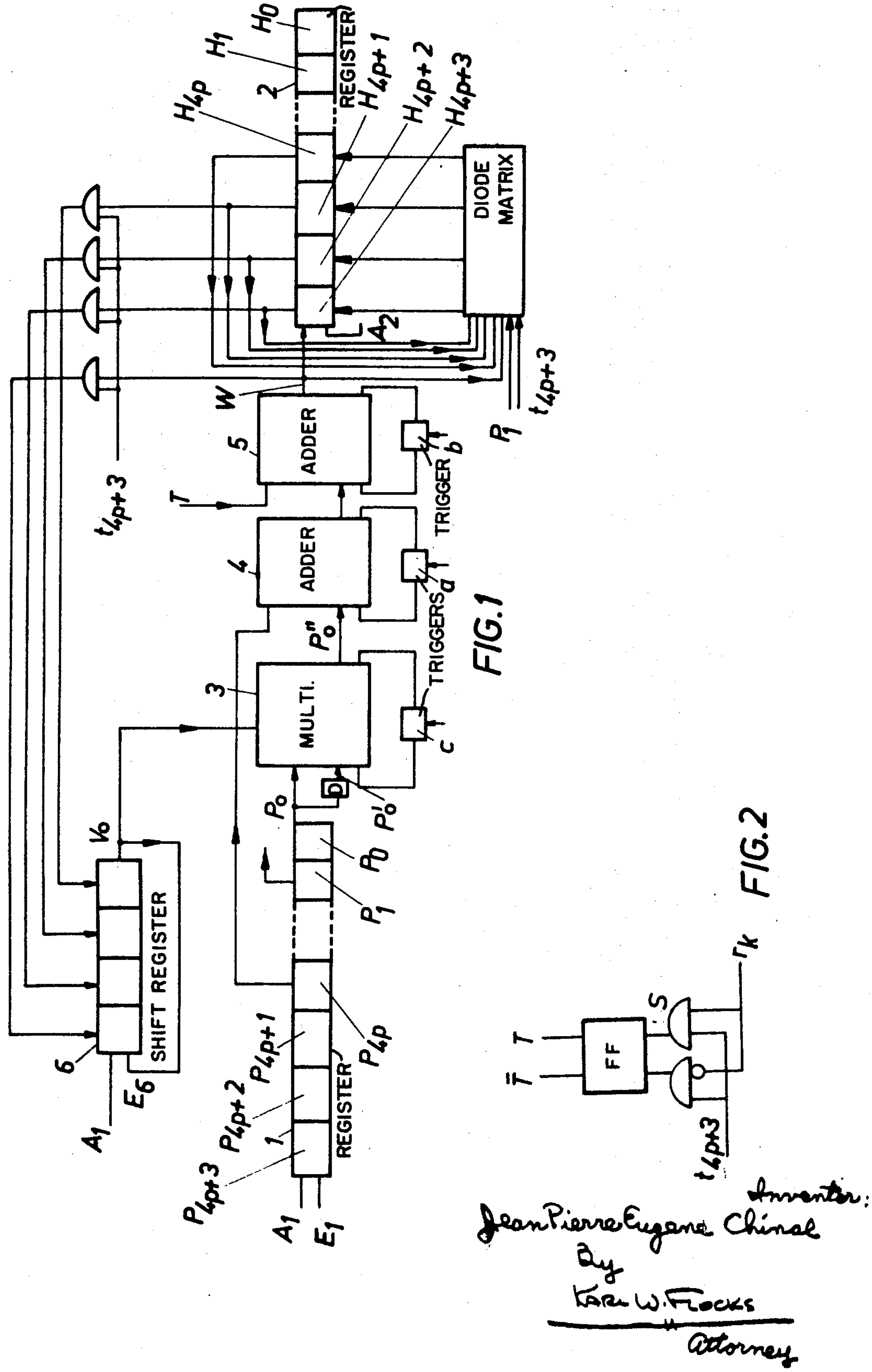
FIG. 1 represents a diagrammatic form of the converter unit according to the invention, in its basic series version taken as an example.
FIG. 2 is a block diagram of a trigger circuit supplying a signal (T) to the input of the third series adder of the converter illustrated in FIG. 1.

As the system exists in several alternative forms, in order to simplify the description, there will be described in the text which follows, the method of conversion utilized in the perspective of the converter of the so-called basic type illustrated in FIG. 1. It is furthermore understood that the length $n$ of the binary words met with in the examples has only been indicated in order to facilitate explanation, and that the use of the converter is not limited either to a particular length of the word or to any particular alternative form. The method of conversion and the converter will also be described in the case of binary-decimal conversions. The indications necessary to obtain the operation of the various alternative forms of binary-decimal converter, or to carry out, in analogous alternative forms, conversions from the binary code to a system with a base other than 10, or with multiple bases, will be given later in the form of modifications to be made to the version described and, for that purpose, the description will not be repeated in its entirety each time.

Thus, a number N can be written in pure binary form as follows:

$$N_2 = B_{n11}\, B_{n12} \ldots B_k \ldots B_1\, B_0 \quad (B_k = 0 \text{ or } 1)$$

and in decimal form: $N_{10} = D_{m11}\, D_{m12} \ldots D_i \ldots)_1\, D_0$ being one of the decimal figures from 0 to 9).

In the standard method of successive extraction of the different figures of the decimal number, repeated divisions by 10 are carried out in the following manner:

$N_{10} = 10A_0 + D_0$
$A_0 = 10A_1 + D_1$
$A_1 = 10A_2 + D_2$
$A_i = 10A_i + 1 + D_i$ etc.

A point is reached at which $A_m < 10$. We then have: $A_m = 0 \times 10 + D_m$ and all the decimal figures which follow $D_m$ (where $D_m = A_m$) are zero. The successive remainders $D_0$, $D_1$, ..$D_m$, 0, 0..... 0..... constitute the desired decimal figures in the order of increasing weights.

The method of division by 10, according to the invention, is based on the fact that the binary development of the fraction 1/10 is periodic with a period of 4, after the first figure to the right of the comma (which is a zero) and is written:

$$1/10 = A0{,}0\ 0011\ 0011\ 0011\ \ldots.$$

The period 0011, the binary equivalent of 3, is repeated to infinity. Knowing this, the infinite development of 1/10 is itself known. In the method according to the invention, there is utilized the number obtained by cutting off the development of 1/10 after $p$ periods and one position, that is to say after the last binary figure of the $p^{th}$ period contained in the development.

In the remainder of the description, there will often be taken by way of example $p=3$ or 4, with the sole object of fixing a basis and without this having any limitative nature. Thus, for $p=3$, the truncated number thus defined is written: $Z_3 = 0{,}0\ 0011\ 0011\ 0011$ Generally speaking, there will be designated by $Z_p$ the number obtained by truncating the development of 1/10 after $p$ periods and one position.

Assuming that $4p$ is the smallest multiple of 4 such that the maximum length $n$ of the numbers to be converted is equal to or less than $4p-2$. In the basic method, the following operations are then carried out: the number (called S in the text which follows) of which there are to be found the quotient and the remainder of the division by 10 is multiplied by 3. The number 3S thus obtained is then multiplied by the number:

$Y_{p+1} = \frac{2}{3} z_{p+1}$; $Y_{p+1}$ is then of the form $Y_{p+1} = 0{,}0001\ 0001\ 0001 \ldots 0001$ with $p+1$ times the period 0001.

Division is then carried out by 2 and there is obtained a binary number of which the fractional portion is X. It is then easy to see that we have the following conditions.

1. Assuming that $S = 10Q + R$, if $R=0$, the whole portion of the result is equal to $Q-1$, and the fractional portion X is the real complement (to 2) of Q, that is to say:

$X = 1 - Q2^{1(4p+4)}$

2. If R is not equal to 0, the fractional portion X of the result obtained is equal to the sum A+B in which $A = (-Q)(2)^{1(4p+4)}$ and $B = R/10(1-2^{1(4p+4)})$. The binary figures of ranks −1 to −6 of the sum A+B are always identical with those of B only. In particular, the five binary figures $x_{11}$, $x_{12}$, $x_{13}$, $x_{14}$ and $x_{15}$ which are the coefficients of the powers $2^{11}$, $2^{12}$ $2^{13}$ $2^{14}$ and $2^{15}$ respectively of X form a binary word which is associated in a biunivocal manner with the value of the remainder R. If this binary word $x_{11}, x_{12}, x_{13}, x_{14}x_{15}$ is considered as the representation of the whole binary number $r$, we have the following relation between the values $r$ and R:

$r = x_{11}$ when $R=0$ $r = x_{11}\, 2^4 + 3R$ when $1 \leq R \leq 5$ $r = x_{11}\, 2^4 + 3(R-5)$ when $6 \leq R \leq 9$ This relation summarizes in arithmetic form the coding of R which constitutes the word $r = x_{11}, x_{12}, x_{13}, x_{14}, x_{15}$, which is given now in the binary form in the following table:

| R | $x_{11}$ | $x_{12}$ | $x_{13}$ | $x_{14}$ | $x_15$ |
|---|---|---|---|---|---|
| 1 | 0 | 0 | 0 | 1 | 1 |
| 2 | 0 | 0 | 1 | 1 | 0 |
| 3 | 0 | 1 | 0 | 0 | 1 |
| 4 | 0 | 1 | 1 | 0 | 0 |
| 5 | 0 | 1 | 1 | 1 | 1 |
| 6 | 1 | 0 | 0 | 1 | 1 |
| 7 | 1 | 0 | 1 | 1 | 0 |
| 8 | 1 | 1 | 0 | 0 | 1 |
| 9 | 1 | 1 | 1 | 0 | 0 |
| 0 | 1 | 1 | 1 | 1 | 1 |

When R=0, the fractional portion of the result is the true complement of $Q2^{1(4p+4)}$. This means that we then have: $x_{11}$, $x_{12}$, $x_{13}$, $x_{14}$, $x_{15}$=11111, which makes it possible to find the case where R=0. Thus, in all cases, an examination of the first five binary figures located to the right of the comma of the result enables the remainder to be deduced. Starting from the same fractional portion X, the quotient Q can be reconstituted in the following manner:

If R is found to be different from 0, the sum is made of the restricted complement of X of the number $x_{11}$ $2^{11}$, of the number $(1-x_{11})$ $2^{1(4p+5)}$ and of the noted number $(x_{12}, x_{13}, x_{14}, x_{15})^{(p+1)}$ formed by definition from the word $(x_{12}, x_{13}, x_{14}, x_{15})$ written $p$+1 times and preceded by a zero.

If it has been found that R=0, there is added to the restricted complement of X the number $(0000)^{(p+1)}$ and the number $2^{1(4p+5)}$.

The restricted complement of X having the value 1−X −2221 (4p+5) (4p+5) can be obtained by complementing the binary word X figure by figure.

Example of division by 10:

```
 S=0000  1011  0101   (S=181 in decimals)
3S=0010  0001  1111
```

After which we have the following multiplication:

```
                    3S=0010  0001  1111
                       0010  0001  1111
                 0010  0001  1111
           0010  0001  1111
-----------------------------------------
             (Y_p+1)  3S
=0010  0100  0011  0011  0000  1111
```

and:

```
X=0      0011     0011     0000      1111
x_-1   x_-2    x_-3    x_-4    x_-5=0     0011
```

from which R=1 (see Code).

It will be observed that the whole portion has a value of 18=(181−1)/10, however, it is possible to employ only the fractional portion X in order to have the quotient Q in accordance with the method given above.

We have in fact:

| | | | | | | | |
|---|---|---|---|---|---|---|---|
| $X=$ | | | 0,0 | 0011 | 0011 | 0000 | 1111 |
| $1-X-2^{14p15}=$ | | | 0,1 | 1100 | 1100 | 1111 | 0000 |
| $(x_{12}x_{13}x_{14}x_{15})^{(p+1)}$ | | = | 0,0 | 0011 | 0011 | 0011 | 0011 |
| $(1-x_{118\ 1})2^{14p15}$ | | = | 0,0 | 0000 | 0000 | 0000 | 0001 |
| Sum | | = | 0,0 | 0000 | 0000 | 0010 | 0100 |
| and | Q | = | 0 | 0000 | 0000 | 0010 | 010 |
| | | | | | (= 18 in decimals) | | |

There will now be described the various possible alternatives according to the present invention of the method of multiplication of the number 3S by the number $Y_{p+1}$:

This multiplication can be made in several ways. In the basic version there is added to the number 3S this same number displaced by four positions to the left, the same again displaced by eight positions, etc., up to $4p$ positions, or a total sum of $p$+1 terms. It is however not desired to determine the quotient from the whole portion, and it is then sufficient to find the figures of the product for $4(p+1)+1$ positions starting from the right. The calculation of the product can be made by considering the blocks of four figures as binary representations of hexadecimal symbols. In these conditions, if $A_k$ represents the hexadecimal symbol of rank K, (K=0, 1, 2,...$p$), $R_k$ the hexadecimal carryover to be added to it, $x_k$ the corresponding figure of the product, $x_{k+1}$ is calculated as the modulo 16 remainder of the sum of $A_{k+1}$, of $x_k$, of $R_{k+1}$ and of $-R_k$.

At the same time as the figure $x_{k+1}$ is determined, the quantity $R_{k+2}-R_{k+1}$ is calculated which must be utilized at the following hexadecimal rank (rank $k$+2).

The calculation of $R_{k+2}-R_{k+1}$ as a function of $R_{k+1}-R_k$, of $x_k$ and $A_{k+1}$, can be made in several ways. $x_k$ and $A_{k+1}$ are positive or zero and the calculation of the sum $x_k+A_{k+1}$ gives a sum figure (hexadecimal) $C_{k+1}$ and a carryover $a_{k+1}$, ($a_{k+1}$=0 or 1). In addition, $R_{k+1}-R_k$ is always included between −1 and +2. The calculation of $C_k+R_{k+1}-R_k$ can be made either by means of an adder or of a subtractor, or by an adder-subtractor (all working in pure binary). This second operation also gives a sum $x_{k+1}$ and a carry over $b_{k+1}$. We have the following cases:

1. Use of an adding device.

If $R_{k+1}-R_k \geq 0$, then $R_{k+2}-R_{k+1}=(a_{k+1})+b_{k+1}$

If $R_{k+1}-R_k < 0$, then $R_{k+2}-R_{k+1}=(a_{k+1})+b_{k+1}-1$

2. Use of a subtraction device

If $R_{k+1}-R_k \geq 0$, then $R_{k+2}-R_{k+1}=(a_{k+1})-b_{k+1}+1$

If $R_{k+1}-R_k<0$, then $R_{k+2}-R_{k+1}=(a_{k+1})-b_{k+1}$

3. Use of an adder-subtractor device.

If $R_{k+1}-R_k \geq 0$, then $R_{k+2}-R_{k+1}=(a_{k+1})+b_{k+1}$ (By using the adding function to make the second sum:...

$C_{k+1}R_{k+1}-R_k$)

if $R_{k+1}-R_k<0$, then $R_{k+2}-R_{k+1}=(a_{k+1})-b_{k+1}$ (By utilizing the subtraction function to make the difference:

$C_{k+1}/R_{k+1}R_k/$).

The sign of $R_{k+1}-R_k$, will be designated by $r_{k+1}$ with the convention $r_{k+1}$=0 when $R_{k+1}-R_k \geq 0$ and $r_{k+1}$=1 when $R_{k+1}<0$.

In these conditions, the relations given above become:

1. Use of an adding device:

$R_{k+2}R_{k+1}=-r_{k+1+}+(a_{k+1})+b_{k+1}$

2. Use of a subtraction device:

$R_{k+2}R_{k+1}=r_{k+1}+(a_{+1})-b_{k+1}$

3. Use of an adder-subtractor device:

$R_{k+2}R_{k+1})=(a_{k+1})+(1-2\,r_{k+1})\cdot b_{k+1}$

There will be represented by $(a_{k+1})$ the binary carryover which is formed after the determination of the binary figure of greatest rank of the "sum" hexadecimal figure $C_{k+1}$. Similarly, $b_{k+1}$ is the carryover formed when there is obtained the binary figure of greatest rank of the hexadecimal figure $x_{k+1}$.

For example, in the case of the series treatment of the hexadecimal figures coded in binary these quantities $a_{k+1}$ and $b_{k+1}$ are identical with the contents of the carryover trigger devices.

Another alternative method of multiplication consists of multiplying S by the number $Y'_{p+1}$ in which all the periods are equal to 1111. Example: $Y'_3$=1111 1111 1111. Generally, we have $Y'_p=2^{4p}-1$, from which $Y'_{p+1}\cdot S=2^{4p+4}\cdot S-S$. We therefore have $Y'_{p+1}\cdot S$ by obtaining the difference of S displaced to the left by $4p+4$ positions and S (which for the first $p+1$ periods of the result amounts to finding the true complement of S).

By proceeding in this way, as $Y'_{p+1}=15\,Y_{p+1}$, the result obtained must then be divided by 5 (this result is a multiple of 5), and then by 2. This division by 5 of a whole number which is known to be a multiple of 5 can be effected simply in the following manner:

Given the binary representation:

$S'=S'_{4p+2}\,S'_{4p+1}\ldots S'_k\ldots S'_1\,S'_0$ of the number $Y'_pS$, the binary figures $x_k$ of the quotient are calculated by sequence as follows:

For each binary rank $k$, the sum modulo 2 of the binary figure $S'_k$, of the figure $x_{k12}$ and a carryover $R_{k11}$ is calculated. At the same time, the new carryover $R_k$ is calculated, this being 1 when, amongst the three vehicles $S'_k$, $X_{k12}$ and $R_{k11}$, two of these or all three are equal to 1. Furthermore, it is assumed that $x_{11}$=0 $x_{12}$=0, $R_{11}$=0.

Example:

```
                          S=0000 1011 0101
               2^(4p+4) S=0000 1011 0101 0000 0000 0000 0000
                    (-S)=-0000 0000 0000 0000 0000 1011 0101
-------------------------------------------------------------
               Y'_p+1 · S=0000 1011 0100 1111 1111 0100 1011
               Y'_p+1 · S
               ----------=0000 0010 0100 0011 0011 0000 1111
                   5
(Sequence of R_k): 0000 0000 0000 0000 0000 0011 1100
x_-1 x_-2 x_-3 x_-4 =                   0 0011, from which R=1.
```

The determination of the quotient is effected as indicated above.

It can be observed that the system which carries out the above division by 5 can be represented by the equations:

$$x_k = S'_k \oplus x_{k-2} \oplus R_{k-1}$$

$$R_k = x_k \cdot \overline{S}'_k + x_k \cdot R_{k-1} + \overline{S}'_k \cdot R_{k-1}$$

(where · is the logic product, + is the logic sum and $\oplus$ is the sum modulos 2).

It has essentially the structure of a subtraction device.

Only the signification of the inputs is different from that of a subtraction device. As for the standard subtractor, it is therefore possible to utilize other equivalent algebraic equations which would be obtained by elementary operations of Boole algebra and of which a large number are conventional in technical literature. These equations express the relations between the values relative to the ranks $k$, $k$+1 and $k$–2. In a series system, $k$, $k$–1 and $k$–2 would correspond to clock times. In systems of the parallel type, the above relations describe the process of sequential (and asynchronous) determination of $x_k$ and $R_k$ moving from the low ranks to the high ranks.

It can furthermore be observed that the division by 2 mentioned above consists, as is well known, of displacing the number to be divided by one rank towards the right. In order to obtain X, this means that there must be taken the first four $p$+1 figures of the product of $Y_{p+1}$ by 3S, the comma being then to the left of the extreme left-hand figure.

It is also clear that the order of the multiplication operations described above can be changed.

By means of FIGS. 1 and 2, there will now be described the general arrangement of a converter according to the invention in its so-called basic series version.

In these drawings, there have been shown symbolically the logic and memory elements. The memory elements (capacity: one bit of information) are represented by squares having one input and two complementary outputs. These are only shown when this is necessary. The symbolical input of a memory element such as a trigger device means that a value on this channel must involve the inscription of the same value in the memory, after a time constant. The adaption of the various types of existing trigger devices (known as R–S, S–K, R–S–T– etc.) and generally of the type of memory unit employed, is a simple and entirely standard problem which, for that reason, will not be further described.

A shifting register is represented by a long rectangle which is in turn formed by the juxtaposition of elementary squares which constitute its stages. In this case also, the constructional details of the stages and their interconnections have not been shown, since these are again conditioned by the particular technology employed and in consequence form part of the current technique of arithmetic calculators or computers. The direction in which the information is propagated is indicated by arrows on the conductors. In addition, the conditions AND and OR which can be employed to form the various logical systems have been shown by graphic symbols. The half-circle which is not traversed by straight lines represents the gate AND, and the other is the gate OR. It is clear that this method is employed for the sole object of giving a simple graphic representation of the system and that it could be modified in order to take account of the logical elements actually employed (and which may be different: functions AND-negation, OR-negation, majority function, etc.). Finally, the complement (negation) of a variable is represented by the letter of the variable surmounted by a bar.

The converter according to the invention functions in the basic version shown in FIG. 1 in a series manner. It has two recirculating registers 1 and 2. The register 1 initially contains the number to be converted and has 4$p$+4 positions. At the end of the conversion, the register 2 contains the number in a binary-coded decimal code. It also comprises three adders of the series type with their carryover trigger devices. The determination of a decimal figure is effected in the converter according to the invention, illustrated diagrammatically in FIG. 1, from the functional point of view, in two stages:

In a first stage, the register 1 recirculates completely (4$p$+4 positions of shift). During the 4$p$+3 first times at which the advance signal $A_1$ is applied to this register, the contents of 1 is multiplied by 3, by means of the series adding device 3. In this stage, the inputs of 3 are the output $P_O$ of the extreme right-hand position of the register 1, together with this same output after passing through a delay line D, this output being designated by $P'_0$. This delay is equal to the interval between 2 clock times and can be obtained in various ways, for example by a trigger device in which the successive values of $P_O$ are entered, these values being then available at the output $P'_0$ at the next following clock time.

During this same period, the adding device 4 employs as its inputs the outputs $P''_0$ of 3 and the output $P_{4p}$ of the fourth position from the left of the register 1, and the adding device 5 employs as its inputs the output of 4 and the output T of a trigger device described later, and the value of which during one period is a quantity $T_k$ which is also defined in the text which follows. It can be seen that the output $T_{4p}$ supplies in series the value of the hexadecimal figure calculated during the previous period, that is to say with a delay of 4 clock times. If 0 represents the clock time at which the first shifting order is applied, it is seen that at the time 4$p$, a number 4 $p$ of shifts has been effected. At the time 4$p$+3 there are in the register 2 the three figures $x_{13}$ $x_{14}$ $x_{15}$ and $x$ ,2 is determined.

By making a normal shift, the word $x_{12}$ $x_{13}$ $x_{14}$ $x_1$5 would be found at the time 4$p$+4 in the first four positions of the register 2. At the same time 4$p$+3, $x_{-1}$ is determined as being $W \oplus P_1$ ($\oplus$ representing the exclusive OR or the sum modulo 2). At the time 4$p$+3, there are determined and entered in the four positions $H_{4p+3}$, $H_{4p+2}$, $H_{4p+1}$, $H_{4p}$ of 2, the binary equivalent of the remainder. This value is obtained from $x_{11}$ $x_{12}$ $x_{13}$ $x_{14}$ $x_{15}$ by a switching system L (for example of the diode matrix type) which will be described later.

At the time $T_{4p+4}$, the register thus contains the position $H_{4p+3}$ $H_{4p+2}$ $H_{4p+1}$ $H_{4p}$, the binary equivalent to four figures of the desired decimal figure (in a code which can be chosen arbitrarily and which is then determined by L).

Thus, during the first 4$p$+4 clock times, the system effects the product by 3 and by $Y_{p+1}$. During the first 4$p$ times, the figures passing out to the output W (figures of X) are reintroduced into the the left-hand position $P_{4p+3}$ of the system 1.

They are not introduced into 2. On the other hand, during the first three times of the ($p$+1) position, W will no longer be introduced at $P_{4p+3}$ while it is entered at the position $H_{4p+3}$ of 2, this latter register then only being shifted one rank per clock time. At the last clock time, $x_{12}$ and $x_{11}$ are determined and combined with $H_{4p+3}$, with four binary figures which is reentered at $H_{4p+3}$, $H_{4p+2}$, $H_{4p+1}$ and $H_{4p}$.

The multiplication by $Y_{p+1}$ is defined for the series case by the following table:

| $r_{k+1}$ | $a_{k+1}$ | $b_{k+1}$ | $R_{k+2} - R_{k+1}$ | $r_{k+2}$ | $T_{k+2}$ | $U_{k+2}$ | $V_{k+2}$ |
|---|---|---|---|---|---|---|---|
| 0 | 0 | 0 | 0 | 0 | 0000 | 0 | 0 |
| 0 | 0 | 1 | 1 | 0 | 0000 | 0 | 1 |
| 0 | 1 | 0 | 1 | 0 | 0000 | 1 | 0 |
| 0 | 1 | 1 | 2 | 0 | 0000 | 1 | 1 |
| 1 | 0 | 0 | –1 | 1 | 1111 | 0 | 0 |
| 1 | 0 | 1 | 0 | 0 | 0000 | 0 | 0 |
| 1 | 1 | 0 | 0 | 0 | 0000 | 0 | 0 |
| 1 | 1 | 1 | 1 | 0 | 0001 | 0 | 1 |

The algebraic addition of $R_{k+1}$–$R_k$ is made in this case by the series adding device 5. The quantity $R_{k+2}$–$R_{k+1}$ prepared during the course of stage $k$+1 is added to $A_{k+2}$ and $x_{k+1}$ in the following manner: as this quantity is comprised between –1 and 2, its value is put into memory, partly or wholly (when this is possible) in the two carryover trigger devices $a$ and $b$, at the end of the stage $k$+1. Thus, in the present case in which the adding device 5 is available to effect the algebraic addition of $R_{k+2}-\alpha^R{}_{k+1}$, the quantity represented by $T_{k+2}$ in the tables can be introduced into one of the inputs of the adding device 5, after having put as the initial values for the stage $k+2$ into the carryover trigger devices *a* and *b* of the two adding devices, the noted values $U_{k+2}$ and $V_{k+2}$. In this case, the values to be entered in the two trigger devices are such that those which are obtained when $r_{k+1}=0$ must be left and one must be taken away in the cases where there are one or two carryovers other than zero when $r_{k+1}=1$.

This is based on the fact that for an adding device of the series type for example, if a carryover equal to 1 is introduced into the lowest rank, this amounts to the same thing as adding 1 to the sum which would otherwise have been obtained. The same operation applied to a subtraction device leads to the subtraction of 1 from the difference which is obtained.

A similar method is applicable to the case in which 5 is replaced by a subtraction device or an adder-subtractor; the corresponding tables are given below.

2) Use of a subtractor instead of the adding device 5

| $r_{k+1}$ | $a_{k+1}$ | $b_{k+1}$ | $R_{k+2}-R_{k+1}$ | $r_{k+2}$ | $T_{k+2}$ | $U_{k+2}$ | $V_{k+2}$ |
|---|---|---|---|---|---|---|---|
| 0 | 0 | 0 | 1 | 0 | 0000 | 1 | 0 |
| 0 | 0 | 1 | 0 | 0 | 0000 | 0 | 0 |
| 0 | 1 | 0 | 2 | 0 | 1111 | 1 | 0 |
| 0 | 1 | 1 | 1 | 0 | 0000 | 1 | 0 |
| 1 | 0 | 0 | 0 | 0 | 0000 | 0 | 0 |
| 1 | 0 | 1 | −1 | 1 | 0000 | 0 | 1 |
| 1 | 1 | 0 | 1 | 0 | 0000 | 1 | 0 |
| 1 | 1 | 1 | 0 | 0 | 0000 | 1 | 1 |

3) Use of an adder-subtractor instead of the adding device 5

| $r_{k+1}$ | $a_{k+1}$ | $b_{k+1}$ | $R_{k+2}-R_{k+1}$ | $r_{k+2}$ | $T_{k+2}$ | $U_{k+2}$ | $V_{k+2}$ |
|---|---|---|---|---|---|---|---|
| 0 | 0 | 0 | 0 | 0 | 0000 | 0 | 0 |
| 0 | 0 | 1 | 1 | 0 | 0000 | 0 | 1 |
| 0 | 1 | 0 | 1 | 0 | 0000 | 1 | 0 |
| 0 | 1 | 1 | 2 | 0 | 0000 | 1 | 1 |
| 1 | 0 | 0 | 0 | 0 | 0000 | 0 | 0 |
| 1 | 0 | 1 | −1 | 1 | 0000 | 0 | 1 |
| 1 | 1 | 0 | 1 | 0 | 0000 | 0 | 0 |
| 1 | 1 | 1 | 0 | 0 | 0000 | 0 | 0 |

The variable having the sign $r_{k+2}$ is stored in a trigger device, the contents of which is rewritten at all $t_{4p+3}$ as a function of $r_{k+1}$, $ak_+1$, $b_{k+1}$, in the manner indicated in the above table; it is seen that in all cases, the portion which remains to be added to $C_{k+2}$ is very simple (0000 or 1111). It should be observed that other combinations are sometimes possible for the values of the carryovers to be put into memory. For example, in the case where there is a subtraction device, it is possible, in order to add 0 to $C_k$ to put into carryovers either $U_{k+2}=0$, $V_{k+2}=0$ or $U_{k+2}=1$, $V_{k+2}=1$, which cancel out in this latter case. It is not necessary to detail here the alternative forms which are immediate, and the choice of which does not necessitate any essential modification of the invention described here.

It can be noted that the above method for the addition of $R_{k+2}-\alpha^R{}_{k+1}$, is not unique and that in particular it could be carried out by resetting the figure devices *a* and *b* to zero and employing for example an adding device to add to the input K the value of $R_{k+2}-R_{k+1}$ when $R_{k2}-R_k1$ 0, its true complement (to 2) when $R_{k+2}-_{RK+1}<0$, or again a subtraction device or an adder-subtractor, following standard methods which, for that reason, will not be described in more detail.

During the second stage, the adding device 3 is employed to add to the complemented contents of the register 1, the correction which enables the quotient to be obtained. This addition lasts $p+1$ whole periods. The register 2 does not move forward during this recirculation, and the output W of 5 is not entered in the position $H_{4p+}$of 2.

The periodic portion of the correction is represented by the output of a so-called correction-shifting register 6, in which there is entered the period at the time $t_{4p+3}$. This period is $x_{-2}\,x_{-3}\,x_{-4}\,x_{-5}$. In addition, it is necessary to add $(1-x_{-1})\,2^{-4p-5}$ if $R\neq 0$, or $x_{-1}\,2^{-4p-5}$ if $R=0$, in the position of lowest rank, which is obtained by entering this value at the time $4p+3$ of the first stage in a carryover trigger device C of the adder 3 for example.

The adding device thus employs during this second stage, the output $\overline{P}_o$ of 1 (supplying the restricted complement of X) and the output $V_o$ of 6. The register 6 recirculates completely $p+1$ times; it has the same advance control $A_1$ as the register 1. It is convenient to reset it to zero at the time $4p+3$ of the second stage, since this simplified the subsequent writing of $x_{12}\,x_13x_14x_15$ in the register, but this is not absolutely necessary. At the end of each stage which lasts for $p+1$ periods, all the carryover trigger devices *a*, *b*, *c* and the trigger device *r* are reset to zero.

The converter also utilizes: a programming device which is to supply the various synchronizing signals necessary, and in particular a signal which indicates the stage in operation. This signal F(F=0 for the first stage, F=1 for the second stage, for example) may be the output of a trigger device. It must be reset to zero at the time $4p+3$ of the second stage. For this purpose, there can be employed the logical product of the signal, equal to 1 at the instant $t_{4p+3}$ and the output F itself.

Pulses are also necessary on the clock times going from 0 to $t_{4p+3}$, a signal $A_{4p}$ having the value of 1 during the first *p* periods and 0 otherwise, a signal $B_{4p}$ equal to 1 during the $(p+1)$ period only (times $t_{4p}$ to $t_{4p+3}$). The expressions given below constitute possible logical expressions for some of the variables described: (+ = logical sum, · = logical product, $\overline{X}$= complement of X).

Values to be entered in $P_{4p+3}$: $\overline{F}\,W\,A_{4p}+F\,P''_0$

Inputs of adding device 3:

FIrst input: $\overline{F}\,P_0+F\,\overline{P}_0$

Second input: $\overline{F}\,P'_0+F\,V_0$

Inputs of adding device 4:

First input: $\overline{F}\,P_{4p}$

Second input $P''_0$

It may be observed that it is also possible to utilize any one of the three adding devices 3, 4, 5 or their alternative forms in order to carry out the correction addition.

It is also possible to eliminate the logical system L if it is acceptable to have a code with five binary figures (*r* ) for the remainder. The register 1 recirculates for $4p+4$ times, but the first stage lasts for at least $4p+5$ times instead of $4p+4$, and the register 2 receives W and is shifted during 5 clock times instead of 4 (during the $p+1$ period and an additional time). The inscription of the period in the register 6 may be made one time later than in the basic version.

The choice between the basic version and this latter version depends on the utilization contemplated for the decimal number desired. It is often possible in fact to use the code with 5 figures (*r*) directly.

In addition to all the alternative forms described above for various elements of the basic version and of their combinations, there may be considered aversion in which, starting from the second recirculation, there is effected at the same time the correction relative to one decimal figure and the search for the remainder relative to the following decimal figure. For this purpose, a further series-adding device must be employed which utilizes $P_0$ and $V_0$, and the output of which replaces, for the adding device 3, the output $P_0$ of the basic version and the value of which displaced by one time replaces $P'_0$.

Thus, when the basic version necessitates two recirculations per decimal figure, this alternative only requires a single one, at the cost of an additional adding machine. The other modifications to be effected with respect to the basic version drive from the techniques of arithmetic computers and are simple to those skilled in the art. This last alternative can be employed alone or in combination with those preceding.

Furthermore, the system giving the signal T must supply (following the method indicated above) the sequence 1111 from a time $t_{4p}$ to a time $t_{4p+3}$. This may be for example a trigger device with two inputs: the input for setting to the value 1 and that for resetting to zero receive a combination of the signals at $t_{4p+3}$ and the signal indicating the necessity of the sequence 1111 ($r_k$ in the case where there are only adding devices), following for example the diagram of FIG. 2. In all cases, this logic would remain very simple.

With regard to the system L, its logic depends on the selected output code with four figures. In the case of the code 8421 for example, there could be employed the following Boole equations for the figures $D_0$, $D_1$, $D_2$, and $D_3$ ($D_i$ associated with the rand $2^i$ ).

$$D_3=x_{-1}x_{-2}(\overline{x}_{-3}x_{-4}\overline{x}_{-5}+x_{-3}\overline{x}_{-4}\overline{x}_{-5}+x_{-3}x_{-4}x_{-5})$$

$$D_2=\overline{x}_{-1}x_{-2}x_{-3}(\overline{x}_{-4}\overline{x}_{-5}+x_{-4}x_{-5})+x_{-1}\overline{x}_{-2}x_{-4}(\overline{x}_{-3}x_{-5}+x_{-3}\overline{x}_{-5})$$

$$D_1=\overline{x}_{-2}x_{-3}x_{-4}\overline{x}_{-5}+\overline{x}_{-1}x_{-2}\overline{x}_{-3}\overline{x}_{-4}x_{-5}+x_{-1}\overline{x}_{-2}\overline{x}_{-3}x_{-4}x_{-5}$$

$$D_0=\overline{x}_{-1}\overline{x}_{-2}\overline{x}_{-3}x_{-4}x_{-5}+\overline{x}_{-1}x_{-2}\overline{x}_{-3}\overline{x}_{-4}x_{-5}+\overline{x}_{-1}x_{-2}x_{-3}x_{-4}x_{-5}+x_{-1}\overline{x}_{-2}x_{-3}x_{-4}\overline{x}_{-5}+x_{-1}x_{-2}x_{-3}\overline{x}_{-4}\overline{x}_{-5}$$

(+ = OR inclusive).

Other systems could be deduced from this by the standard techniques of Boole algebra.

FIG. 1 represents a general diagram of the converter in its basic version. The blocks represent the adding devices and contain the input switching logic for the two stages. The trigger device F has not been shown nor have certain standard constructional details, the latter being simple for those skilled in the art who use the description of the converter.

In particular, certain clock signals have not been shown. Also, the controls of the trigger device *a*, *b*, *r* as a function of $a_{k+1}$ , $b_{k+1}$ , $r_{k+1}$ , have not been shown since they depend on the particular type of trigger device employed, and furthermore, their construction would be conventional in the knowledge of the tables given above for the functions of *a*, *b* and *r*.

The system L receives $P_1$ as its input, which serves to form $x_{11}$ .

It may also be noted that $Y_p$ and $Y'_p$ could be employed instead of $Y_{p+1}$ and $Y'_{p+1}$ .

The corresponding multiplications would last only for 4*p* periods. However, the figures $x_{12}\,x_{13}\,x_{14}\,x_{15}$ which are obtained in the basic method may be different: the number *r* (remainder) may become reduced by one unit of low rank in certain cases. The combinations $x_{11}\,x_{12}\,x_{13}\,x_{14}\,x_{15}$ remain always detachable since the difference between the remainders corresponding to two successive remainders is greater than or equal to 3. Thus, R=1 when $x_{11}\,x_{12}\,x_{13}\,x_{14}\,x_{15}$=000 11 or 000 10,R=2 when $x_{11}\,x_{12}\,x_{13}\,x_{14}\,x_{15}$=00110 or 00101 etc. This circumstance is generally of such nature as to simplify slightly the subsequent decoding of $x_{11}\,x_{12}\,x_{13}\,x_{14}\,x_{15}$.

It may be observed that the converters described above comprise, as essential parts, series adding or subtraction devices. It is known that by the repetition of such adding devices, it is possible in a standard manner to obtain so-called adding or subtraction devices which carry out the addition in one clock time instead of *n* times, *n* being the length of the numbers treated and the number of stages of the parallel adding or subtraction device.

It would thus be easy to transpose in a similar manner the converter described above, so as to obtain devices which carry out one or more additions brought into play by the multiplications by 3, $Y_{p+1}$ following the parallel method.

The method and the converters which have been described for conversions from the binary system to the decimal numeration system may be transposed and utilized more minor modifications to the case of conversion of binary to another system p+1 numeration with a base *b* not equal to 10. The method again consists in utilizing, in a similar manner, the truncated development of 1/*b*.

There will be described below by way of example, the cases of *b*=6 and *b*=60 We have 1/6=0,0 0101 0101 0101 ...

It is only necessary to replace the multiplication by 3 described above by a multiplication by 5 (effected by adding to S the number S shifted by two positions to the left). A multiplication is then carried out by $Y_{p+1}$ as above (by one of the two methods indicated). The remainder is again detected by examining the figures $x_{11}$ to $x_{15}$ . The table shown below gives $x_{11}\,x_{12}\,x_{1}3\,x_{14}\,x_{15}$ as a function of the remainder. The period *k* of the periodic portion of the correction is $x_{12}\,x_{13}\,x_{14}\,x_{15}$ when R is not equal to 0 and is 0000 when R=0.

| R | $x_{-1}$ | $x_{-2}$ | $x_{-3}$ | $x_{-4}$ | $x_{-5}$ |
|---|---|---|---|---|---|
| 1 | 0 | 0 | 1 | 0 | 1 |
| 2 | 0 | 1 | 0 | 1 | 0 |
| 3 | 0 | 1 | 1 | 1 | 1 |
| 4 | 1 | 0 | 1 | 0 | 1 |
| 5 | 1 | 1 | 0 | 1 | 0 |
| 0 | 1 | 1 | 1 | 1 | 1 |

It is also possible to multiply by $Y'_{p+1}$ and then to divide by 15. As for the case where *b*=10, it would be possible to use $Y_p$ and $Y'_p$ instead of $Y_{p+1}$ and $Y'_{p+1}$ by proceeding in a similar manner This division by 6 may be combined with division by 10 in order to effect binary-sexagesimal conversions in which the sexagesimal symbols are coded in decimals (with the aid of two decimal symbols per sexagesimal symbol).

A sexagesimal number of this form is for example:

x=($k_1$10+($k^1_0$ 10+$k^0_0$ ) The sequence of the $k_i^j$ symbols are obtained by dividing successively by 10 and 6, starting with 10. The successive remainders are the $k_i^j$ symbols desired.

This operation necessitates a few simple switching operations between the two types of division, and also the use of an additional system L if it is desired to have a four-figure output code.

In a similar way, we have:

1/60=0,00 0001 0001 0001 ......

It is seen that in order to divide by 60 it is necessary to eliminate the multiplication by 3 at the beginning and to divide by 4 after the multiplication by $Y_{p+1}$ .

The remainders are given by the 6 figures $x_{11}$ to $x_{16}$ of the product R/ 60. It can be seen that if *r* represents the binary equivalent of $x_{11}\,x_{12}\,x_{13}\,x_{14}\,x_{15}\,x_{16}$ considered as a whole, we have the relation:

$r=x_{11}\,2^5+x_{12}\,2^4+(R-R')$ when R is not zero with R′=0 when $1\leq R\leq 15$ R′=15 when $16\leq R\leq 30$ R′=30 when $31\leq R\leq 45$ R′=45 when $46\leq R\leq 59$ and *r*=63 when R=0.

It is clear that a similar method could be employed with any base *b*, by utilizing a truncated development. The method is particularly simple when *b* is a prime number (multiplied when so required by a power of 2 ) since *b* then divides $2^{b11}-1$, which is represented by *b*−1 figures 1, and 1/*b* is of the form $a/2^{b11}-1$ in which *a* is a whole number. Furthermore, $1/2^{b11}-1$ is a periodic fractional number, the period of which has *b*−1 figures, all zeros with the exception of that on the right. (Thus 1/1111 =0,0001 0001 0001 ....) This number $1/2^{b11}-1$ truncated after *p*+1 periods, replaces the quantity $Y_{p+1}$.

Finally it will be noted that the converter described above can be modified simply so as to effect the conversion of mixed numbers, that is to say having at the same time a whole portion and a fractional portion. It is know that the conversion of the fractional portion can be effected by successive multiplications by the base *b* of the system in which the conversion is made, and in carrying over the successive overflows towards the left of the product thus obtained (which are eliminated before the next multiplication).

In the present case, this amounts to the same thing as adding a supplementary switching which replaces the initial multiplication by 3 or 5 or 1 by a multiplication by 10, 6 or 60 respectively In the more general case in which *b* is a prime, we have $1/b=a/2^{b11}-1$ and the initial multiplication by *a* is replaced by a multiplication by *b*.

In the same way, all the possibilities of switching described in the foregoing text could themselves be employed in various combinations.

Finally and by way of example, irrespective of the alternative form employed, the converter according to the invention can be used for the following applications and can therefore serve:

As a laboratory apparatus: by means of a possible adaptation of the levels of voltage, impedance, etc. it can be connected to an arithmetic system (the register of a calculator, memory, etc.), thus enabling the operator to read directly in decimals the number supplied in pure binary.

As the output member of a computer: it may be utilized inside a unit of inputs and outputs so as to be applied to a visual indication system. It can be multiplied between a number of binary sources. The converter can be constructed in a convenient manner in a drum type calculator by utilizing as shifting registers tracks on the drum (in a recirculating register).

It may also be employed as the central member of an arithmetic calculator unit, since the adding function is one of the special functions obtained by the system of conversion.

It may be utilized as a coding device for a calculator utilizing the system of numeration of residual classes, the determinations of the residues $R_i$ relative to each modulus $m_i$ can be effected simultaneously (with converters having auxiliary registers as previously seen) or successively by switching.

Finally, the present invention is particularly well adapted to the production amongst other applications) of an independent conversion system in all its alternative forms. In this respect, it does not have a drawback frequently present in more conventional converters which is their dependence in respect of a complete arithmetic computer. In addition, it is economic in construction while at the same time it is faster than counting methods.

It will of course be understood that the present invention has only been described and shown by way of pure explanation and not in any limitative sense, and that any modification of detail may be made to it without thereby departing from its scope.

What is claimed is:

1. A binary-decimal converter for a binary number $S=10Q+R$ (this being decimal notation) of $n$ digits, where $n \leq 4p-2$, $p$ being an integer, the converter comprising an input shift register having $4p+4$ positions, means for multiplying the contents of said input register by $3\gamma_{p+1}/2$ where $$\gamma_{p+1}=\frac{0.0001\ 0001\ .\ .\ .\ .\ .\ 0001}{p+1\text{ times}}$$

(this being binary notation)

an output shift register having $4p+4$ positions, a recirculation register for the inscription of a period of correction, means for adding outputs of the input register and the recirculation register, a matrix for determining, in accordance with a predetermined code, the remainder R of division by 10 (ten) of the binary number S and connected to the first four positions of the output register and to the penultimate position of said input register, and a switching, programming and clock circuit for controlling the functioning and interconnections of the elements of the converter, the arrangement being such that the converter functions to determine the quotient and remainder in two stages of operation, each of $p+1$ periods and of $4p+4$ clock times, each period being 4 clock times, operation for operation, S is entered in adjacent positions in the input register with the lowest order digit in the lowest order position and is multiplied by $3\gamma_{p+1}/2$ digit by digit, the resultant being reentered in said input register for the first $p$ periods and being fed during the ($p+1$th period digit by digit to the output register, a fractional portion of the resulting binary number being represented by $x=x_{11}x_{12}x_{13}x_{14}x_{15}$, being sent to said matrix at the end of said first stage, $x$ having a one-to-one relationship with R, and wherein prior to the second stage $x_{12}x_{13}x_{14}x_{15}$ is entered in said recirculation register and during said second stage is summed (if $R\neq 0$) as a number with repeated periods of those four digits with the restricted complement $\overline{x}$, with the number $x_{11}2^{11}$ and with the number $(1-x_{11})2^{1(4p+5)}$ whereby the quotient Q is determined in binary form, while if R=0 there is added $\overline{x}$ and $x_{11}2^{1(4p+5)}$ also giving Q in binary form, the restricted complement of $x$, defined as $\overline{x}=1-x-2^{14p15}$, being obtainable from said input register, and by the end of said second stage Q being entered as S in the input register for further conversion.

2. A converter as claimed in claim 1, wherein said adding means is a first series-adding device and carryover trigger device serving in the first stage for multiplying S by 3, having two inputs from the lowest order position of the input register, one being via delay means that imparts a delay of one clock time.

3. A converter as claimed in claim 2, wherein said multiplying means includes a second series-adding device and carryover trigger device having inputs from the output of the first series-adding device and from the fourth highest order position of the input register.

4. A converter as claimed in claim 3, wherein said multiplying means includes a third series-adding device and carryover trigger device having inputs from the output of the second series-adding device and from a trigger system supplying between clock pulses having a predetermined spacing in the sequence 1111, whereby there is obtained the value of the hexadecimal figure calculated during the preceding period and at the time $t_{4p+4}$ of the first stage number $x_{12}x_{13}x_{14}x_{15}$ which is entered in the output register.

5. A converter as claimed in claim 2, wherein said multiplying means includes adding-subtraction device with an associated trigger device arranged to determine the modulo 16 sum of $R_{k+1}$ and $-R_k$ from the contents of the carryover trigger devices associated with the first and second series adding devices, and thence the value of $X_{k+1}$ from the modulo 16 sum of the above result and the contents of its associated trigger device.

6. A binary-decimal converter for a binary number $S=10Q+R$ (this being decimal notation) of $n$ digits, where $n$ $4p-2$, $p$ being an integer, the converter comprising an input shift register having $4p+4$ positions, means for multiplying the contents of said input register by E=1111 1111···1111 (binary notation) formed by $p+1$ groups of four ones an output shift register having $4p+4$ positions, a recirculation register for the inscription of a period of correction, means for adding outputs of the input register and the recirculation register, a matrix for determining, in accordance with a predetermined code, the remainder R of division by 10 (ten) of the binary number S and connected to the first four positions of the output register and to the penultimate position of said input register, and a switching, programming and clock circuit for controlling the functioning and interconnections of the elements of the converter, the arrangement being such that the converter functions to determine the quotient and remainder in two stages of operation each of $p+1$ periods and of $4p+4$ clock times each period being 4 clock times, wherein for operation S is entered in adjacent positions in the input register with the lowest order digit in the lowest order position and is multiplied by E digit by digit, and there being means for dividing the result by 5 and then by 2, the first dividing means including a subtraction device permitting the logical operations to be carried out as defined by the equations:

$$X_k=S'_k\oplus X_{k-2}\oplus R_{k-1}$$

$$R_k=X_k\cdot\overline{S}'_k+X_k\cdot R_{k-1}+\overline{S}'_k\cdot R_{k-1}$$

where $\cdot$ is the logic product, + is the logic sum and is the sum modulo 2 the resultant being reentered in said input register for the first $p$ periods and being fed in the ($p+1$)th period digit by digit to the output register, a fractional portion of the resulting binary number being represented by $x=x_{11}x_{12}x_{13}x_{14}x_{15}$, being available to said matrix at the end of said first stage, $x$ having a one-to-one relationship with R, and wherein prior to the second stage $x_{11}x_{12}x_{13}x_{14}x_{15}$ is entered in said recirculation register and during said second stage is added (if R 0) as a number with repeated periods of those four digits to the restricted complement $\overline{x}$, to the number $x_{11}2\ ^{1}1$ and to the number $(1-x_{11})2^{1(4p+5)}$ whereby the quotient Q is determined in binary form, while if R=0 there is added $\overline{x}$ and $x_{11}2^{1(4p+5)}$ also giving Q in binary form, the restricted complement of $x$, being defined as $\overline{x}=1-x-2^{14p15}$, being obtainable from said input register, and by the end of said second stage Q being entered as S in the input register for further conversion.